United States Patent [19]

Ohtsu et al.

[11] Patent Number: 4,743,377

[45] Date of Patent: May 10, 1988

[54] PACKING MATERIAL FOR LIQUID CHROMATOGRAPHY

[75] Inventors: Yutaka Ohtsu; Hiroshi Fukui; Motokiyo Nakano; Okitsugu Nakata; Taketoshi Kanda; Isao Tanaka; Osamu Shirota; Junichi Koyama, all of Yokohama, Japan

[73] Assignee: Shiseido Company Ltd., Tokyo, Japan

[21] Appl. No.: 880,757

[22] Filed: Jun. 30, 1986

[30] Foreign Application Priority Data

Jul. 2, 1985 [JP] Japan .................................. 60-143857
Jun. 24, 1986 [JP] Japan .................................. 61-146204

[51] Int. Cl.$^4$ ............................................. B01D 15/08
[52] U.S. Cl. ................................. 210/635; 210/198.2; 210/502.1; 210/656; 427/212; 427/221; 428/405; 502/401; 502/402; 502/439
[58] Field of Search ...................... 502/401, 402, 439; 210/635, 656, 198.2, 198.3, 502.1; 428/405; 427/212, 221

[56] References Cited

U.S. PATENT DOCUMENTS

| | | | |
|---|---|---|---|
| 3,502,217 | 3/1970 | Bruckner | 502/402 |
| 3,722,181 | 3/1973 | Kirkland | 502/402 |
| 3,795,313 | 3/1974 | Kirkland | 502/401 |
| 3,839,385 | 10/1974 | Meiller | 502/401 |
| 3,887,601 | 6/1975 | Kanner | 521/112 |
| 3,892,678 | 7/1975 | Halasz | 502/401 |
| 3,984,349 | 10/1976 | Meiller | 502/401 |
| 4,145,506 | 3/1979 | Yamamoto | 210/198.2 |
| 4,242,227 | 12/1980 | Nestrick | 502/402 |
| 4,276,061 | 6/1981 | Nestrick | 210/198.3 |
| 4,298,500 | 11/1981 | Abbott | 210/198.3 |
| 4,512,898 | 4/1985 | Oi | 502/402 |
| 4,528,324 | 7/1985 | Chung | 528/34 |
| 4,539,367 | 9/1985 | Beers | 528/34 |

FOREIGN PATENT DOCUMENTS

2074042 10/1981 United Kingdom .............. 502/401

OTHER PUBLICATIONS

Chalk Homogeneous Catalysis, II, The Mechanism of the Hydrosilation of Olefins Catalyzed, by Group VIII Metal Complexes Journal of the American Chemical Society, 87:1, Jan. 5, 1965, pp. 16–21.
Journal of Chromatography, 351 393–408, Jan. 31, 1986, Figge et al, "Coating of Silica by Polymers of Various Polarities".

*Primary Examiner*—Ernest G. Therkorn
*Attorney, Agent, or Firm*—Sprung Horn Kramer & Woods

[57] ABSTRACT

A packing material for liquid chromatography, comprising particles having a silicone polymer film coated on substantially the entire surface thereof, the packing material being produced by a process comprising the steps of:

(a) bringing at least one silicone compound having the general formula (I):

$$(R^1HSiO)_a(R^2R^3SiO)_b(R^4R^5R^6SiO_{\frac{1}{2}})_c \qquad (I)$$

wherein $R^1$, $R^2$, and $R^3$ represent, independently, a hydrocarbon residue having 1 to 10 carbon atoms, which may be substituted with at least one halogen atom, $R^4$, $R^5$, and $R^6$ represent, independently, hydrogen or a hydrocarbon residue having 1 to 10 carbon atoms, which may be substituted with at least one halogen atom, a is zero or an integer of 1 or more, b is zero or an integer of 1 or more, c is zero or 2, and a+b+c is 3 to 300, into contact with particles, whereby the silicone compound is polymerized on substantially the entire surface of the particles, and (b) crosslinking unreacted Si—H groups in the presence of a catalyst, or (c) carrying out an addition reaction of a vinyl compound having up to 40 carbon atoms to unreacted Si—H groups.

29 Claims, 3 Drawing Sheets

PACKING MATERIAL FOR LIQUID CHROMATOGRAPHY

BACKGROUND OF THE INVENTION

1. Field of the Invention

The present invention relates to a packing material for liquid chromatography, comprising particles having a silicone polymer film coated on substantially the entire surface thereof.

2. Description of the Related Art

Recently, there have been increased developments in analysis or purification techniques using high performance liquid chromatography. In some cases, purification is carried out on a commercial scale using an extra large liquid chromatograph column. In such analysis or purification, the qualities of a packing material in a column are very important.

It is believed that about 80 percent of high performance liquid chromatography for analysis or purification is currently carried out by means of reversed phase liquid chromatography. Various methods have been disclosed using an ODS (octadecylchlorosilane)silica gel (i.e., $C_{18}$-type) packing material which is prepared by chemically bonding dimethyloctadecylchlorosilane to silanol (Si—OH) groups of silica gel. Other packing materials or supports for reversed phase liquid chromatography are known, for example, a $C_8$-type packing material prepared by bonding dimethyloctachlorosilane to the silanol groups of silica gel; a $C_4$-type packing material prepared by bonding dimethylbutylchlorosilane; a $C_1$-type packing material prepared by bonding trimethylchlorosilane, and a phenyl-type packing material prepared by bonding triphenylchlorosilane, and the like.

In the bonded type packing materials or supports conventionally used for reversed phase liquid chromatography, however, 10–20% of the silanol groups remain unreacted because of an incomplete reaction between the silanol groups and alkyl or phenylchlorosilane. It is generally considered that the larger becomes the molecular weight of the silane compound, the more unreacted silanol groups remain; namely, $C_{18}$-type > $C_8$-type > $C_4$-type > $C_1$-type.

The presence of such residual silanol groups is a serious problem in reversed phase liquid chromatography. In the analysis or purification of a polar substance, the residual silanol groups, if any, strongly interact with the polar substance. Thus, such an analysis or purification results in a wide peak and tailing. Further, a highly polar substance irreversibly adsorbs such residual silanol groups. Thus, the function of a column packed with such a conventional material is rapidly deteriorated. In addition, the presence of a hydrophilic surface of the silica gel as well as residual silanol groups thereon causes a conventional packed column to become weak against acids and alkalis, and thus limits the pH region of a mobile phase solvent to within 2 to 7.

In order to solve the problems mentioned above, and the like, some conventional packing materials prepared by a reaction with dimethyloctadecylchlorosilane or dimethyloctylchlorosilane have been treated again with trimethylchlorosilane (TMS) or the like, so as to block the residual silanol groups. But, such a post-treatment with TMS cannot completely avoid the presence of residual silanol groups, and a high quality packing material without such residual silanol groups has not been developed for reversed phase liquid chromatography. In addition to the above incomplete blocking of the residual silanol groups by the post-treatment with TMS, the problem of a low resistance to acids and alkalis, due to the presence of an exposed hydrophilic surface of the silica gel has arisen.

SUMMARY OF THE INVENTION

It has now been found that a novel resin-encapsulated type packing material, which is essentially different from the conventional bonded type packing material, can minimize the influence of the residual silanol groups and greatly enhance the resistance to acids and alkalis.

Accordingly, an object of the present invention is to provide a packing material for liquid chromatography, which is not affected by silanol groups, ensures a sharp peak even for a polar compound, has an excellent resistance to acids and alkalis, and is operable over a long term.

Other objects and advantages of the present invention will be apparent from the following description.

In accordance with the present invention, there is provided a packing material for liquid chromatography, comprising particles having a silicone polymer film coated on substantially the entire surface thereof, the packing material being produced by a process comprising the steps of:

(a) bringing at least one silicone compound having the general formula (I):

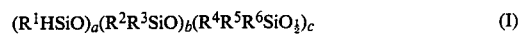

wherein $R^1$, $R^2$, and $R^3$ represent, independently, a hydrocarbon residue having 1 to 10 carbon atoms, which may be substituted with at least one halogen atom, $R^4$, $R^5$, and $R^6$ represent, independently, hydrogen or a hydrocarbon residue having 1 to 10 carbon atoms, which may be substituted with at least one halogen atom, a is zero or an integer of 1 or more, b is zero or an integer of 1 or more, c is zero or 2, and a+b+c is 3 to 300, into contact with particles, whereby the silicone compound is polymerized on substantially the entire surface of the particles, and (b) crosslinking unreacted Si—H groups in the presence of a catalyst, and optionally (c) trimethylsilylating Si—OH groups formed slightly in said step (b) with an agent capable of providing a trimethylsilyl group.

In accordance with the present invention, there is also provided a packing material for liquid chromatography, comprising particles having a silicone polymer film coated on substantially the entire surface thereof, the packing material being produced by a process comprising the steps of:

(a) bringing at least one silicone compound having the general formula (I):

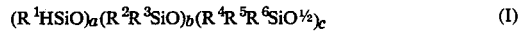

$R^1$, $R^2$, $R^3$, $R_4$, $R^5$, $R^6$, a, b and c have the meanings as given above, into contact with particles, whereby the silicone compound is polymerized on substantially the entire surface of the particles, (b) carrying out an addition reaction of a vinyl compound having up to 40 carbon atoms to unreacted Si—H groups, and optionally, (c) crosslinking unreacted Si—H groups in the presence of a catalyst, and optionally (d) trimethylsilylating Si—OH groups formed slightly in said step (c) with an agent capable of providing a trimethylsilyl group.

DESCRIPTION OF THE PREFERRED EMBODIMENTS

Figure 1:
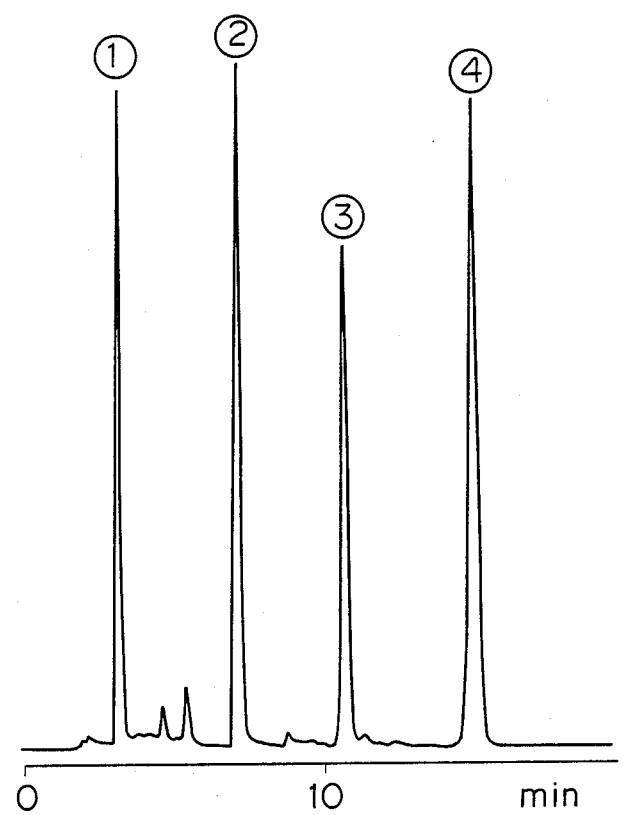
FIG. 1 shows a chromatogram resulting from a bonded type packing material of a prior art.

The term "particle" used herein means a porous matter which has an average particle size of 3 to 1,000 m, a specific surface area of 10 to 1,000 m²/g, and pores of 30 to 1,000 Å. To produce the novel packing material of the present invention, any particles conventionally used as a support in liquid chromatography may be used, for example, silica gel, alumina, glass beads such as porous glass, zeolite, hydroxyapatite or graphite. In addition, a composite particle may be used which is prepared by coating inorganic fine powder materials such as silica gel, titanium dioxide, or hydroxyapatite powder materials on the surface of a synthetic resin particle such as polyamide, acrylic resin, or polyvinyl alcohol particle. Preferably, a spherical or irregular silica gel having pores of 50 to 500 Å, particularly 60 to 300 Å, a specific surface area of 50 to 600 m²/g, and an average particle size of 3 to 500 μm is used.

It has been found that a uniform silicone polymer film which is insoluble in an organic solvent such as hexane, benzene, chloroform, acetone, methyl alcohol or acetonitrile, or water can be formed on the surfaces of the particles by bringing the particles into contact with a silicone compound having Si—H groups, whereby the silicone compound is polymerized on the surfaces of the particles, and crosslinking and/or adding a vinyl compound thereto.

In the present invention, a silicone compound having the general formula (I):

$$(R^1HSiO)_a(R^2R^3SiO)_b(R^4R^5R^6SiO_{\frac{1}{2}})_c \quad (I)$$

wherein $R^1$, $R^2$, $R^3$, $R^4$, $R^5$, $R^6$, a, b and c have the meanings as given above, alone or in any mixture thereof, is brought into contact with the particles.

The term "hydrocarbon residue" for the above groups $R^1$ to $R^6$ denotes a straight or branched alkyl group, particularly a lower alkyl group having 1 to 4 carbon atoms, such as methyl, ethyl, n-propyl or n-butyl; a cycloalkyl such as cyclohexyl; a cycloalkenyl group such as cyclohexenyl; an aryl group, particularly phenyl or naphthyl; an aralkyl group such as phenylmethyl or phenylethyl; or an alkyl-substituted aryl group such as methyl phenyl.

The halogen atom is a chlorine, bromine, iodine or fluorine atom.

The silicone compounds having the general formula (I) can be classified into two groups. The first group of the silicone compound is a cyclic silicone compound corresponding to the compound of the formula (I) wherein c is zero, and has the following structure (V):

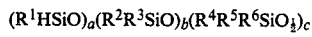

$$(R^1HSiO)_{a'}(R^2R^3SiO)_{b'} \quad (V)$$

wherein $R^1$, $R^2$, and $R^3$ have the meanings as given above, and a' and b' have the same meanings as a and b, respectively, with the proviso that a'+b' is 3 to 300.

In the present invention, it is preferable to use a cyclic silicone compound of the formula (V) wherein $R^1$, $R^2$, and $R^3$ represent, independently, a lower alkyl such as methyl, ethyl, n-propyl or n-butyl, or an aryl, particularly phenyl, and a'+b' is 3 to 100. The groups $R^1$, $R^2$, and $R^3$ may be different from each other, but preferably are identical.

A particularly preferable cyclic silicone compound has the following formula (VI):

wherein $R^1$ has the meaning as given above, and a" is an integer of 3 to 300. Preferably, $R^1$ is methyl or ethyl, and a" is 3 to 100 in the formula (VI).

As a suitable cyclic silicone compound, there may be mentioned, for example, tetrahydrogen tetramethyl cyclotetrasiloxane, tetrahydrogen tetraethyl cyclotetrasiloxane, tetrahydrogen tetraphenyl cyclotetrasiloxane, tetrahydrogen dodecamethyl cyclooctasiloxane, tetrahydrogen tetraoctyl cyclotetrasiloxane, or the like.

Further, in the present invention, a mixture of the cyclic silicone compounds comprising various distributed numbers (such as 30 to 50, 80 to 100) of recurring units may be used.

The second group of the silicone compound is a linear silicone compound corresponding to the compound of the formula (I) wherein c=2, and has the following structure (VII):

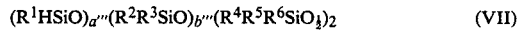

$$(R^1HSiO)_{a'''}(R^2R^3SiO)_{b'''}(R^4R^5R^6SiO_{\frac{1}{2}})_2 \quad (VII)$$

wherein $R^1$, $R^2$, $R^3$, $R^4$, $R^5$, and $R^6$ have the meanings as given above, and a''' and b''' have the same meanings as a and b, respectively, with the proviso that a''' +b'''+2 is 3 to 300.

In the present invention, it is preferable to use a linear silicone compound of the formula (VII) wherein Rhu 1, $R^2$, $R^3$, $R^4$, $R^5$, and $R^6$ represent, independently, a lower alkyl such as methyl, ethyl, n-propyl or n-butyl or an aryl particularly phenyl, and a'''+b''' is 3 to 100. The groups $R^1$ to $R^6$ may be different from each other, but preferably are identical.

As a suitable linear silicone compound, there may be mentioned, for example, 1,1,1,2,3,4,4,4-octamethyltetrasiloxane, 1,1,1,2,3,4,5,5,5-nonamethylpentasiloxane, and 1,1,1,2,3,4,5,6,6,6-decamethylhexasiloxane.

The silicone compound having the formula (I), either in a vapor or liquid phase, is brought into contact with the particles.

The contact between the particles and the vaporized silicone compound (vapor phase treatment) may be carried out in the following manner:

1 part by weight of particles such as silica gel particles and 0.01–1 part by weight of silicone compound in a solid or liquid phase are charged into two different small vessels, respectively. The two vessels are placed in a large closed vessel, such as a desiccator or a closed constant-temperature chamber, having a volume 5 to 500 times the volume of the particles. After closing the vessel, the whole is heated at 50°-200° C. for 2 hours or more. During heating, the particles may be left to stand at rest, but are preferably stirred. Therefore, it is preferable to use a vessel provided with a stirrer, or a vibrating or rotating vessel, in order to move the particles therein.

When a large amount (e.g., 5 kg or more) of the particles is treated, there may be used an apparatus comprising a rotating reactor with a heater and an insulating jacket, and a tank for a feeding silicone compound, the tank having an insulating jacket and being connected with the reactor. After the particles in a large amount are charged in the reactor, the system is evacuated by a vacuum pump, and heated to 50° C. or more. A valve of the tank which has been heated at the same temperature is opened to feed the vaporized silicone compound into the reactor, in which the compound comes into contact with the particles. Preferably, the reactor is periodically rotated in order to move the particles, during the contact.

After evacuating the system, it is also possible to replace the atmosphere in the system with an inactive gas such as nitrogen, and then feed in the vaporized silicone compound.

Alternatively, a reactor provided with a small vessel therein may be used. The silicone compound in a solid or liquid phase is charged in the small vessel, and the system is heated under a reduced or atmospheric pressure to vaporize the silicone compound and bring the vapor into contact with the particles. Further, it is also possible to use an open system, and to feed the vaporized silicone compound from the tank by means of a carrier gas such as nitrogen.

The silicone compound suitable for this vapor phase treatment is, for example, tetrahydrogen tetraethyl cyclotetrasiloxane, or tetrahydrogen tetramethyl cyclotetrasiloxane.

The silicone compound dissolved in a volatile solvent for the silicone compound (e.g. benzene, dichloromethane, or chloroform, or preferably hexane) may be brought into contact with the particles (liquid phase treatment). A solution containing 1-50% by weight of the silicone compound is prepared, and added to the particles with stirring so that 0.01-1 part by weight of the silicone compound is applied to 1 part by weight of the particles. In the liquid phase treatment, it is preferable to evaporate the solvent, prior to polymerization of the compound on the surfaces of the particles.

The silicone compound used in the liquid phase treatment is generally the cyclic or linear silicone compound containing 10 or more recurring units.

The polymerization of the silicone compound on the surfaces of the particles can be carried out by allowing the particles to stand at a temperature of 50°-200° C. for 2 hours or more, with or without stirring the particles.

Active sites present on the surfaces of the particles can facilitate the above polymerization. Thus, it is not necessary to add a catalyst. The term "active site" used herein means those capable of catalytically polymerizing a silicone compound having a siloxane bond (Si—O—Si) or a hydrosilyl group (Si—H) (i.e., acidic, basic, oxidative, or reductive sites). The polymerization ceases when all of the active sites on the surfaces of the particles are covered with a silicone polymer film. If the particles, per se, have a very low activity, an alkaline catalyst such as sodium, potassium, lithium, ammonium or calcium hydroxide, or alkyl metal catalyst such as dibutyltin may be appropriately added to the particles before or after said vapor or liquid phase treatment with the silicone compound.

When the particles are brought into contact with the above silicone compound in a vapor or liquid phase and heated, the above silicone compound is polymerized on the surfaces of the particles in two different ways. In the first way, the silicone compound is polymerized by means of crosslinking Si—H groups to form a network structure on the surfaces of the particles, as follows:

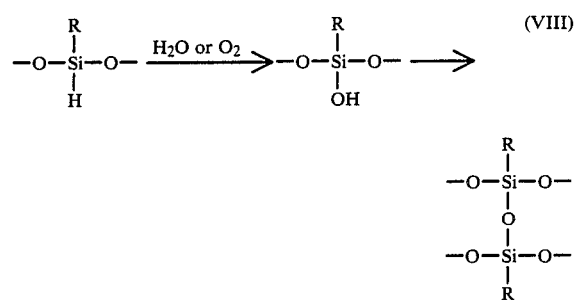 (VIII)

wherein R represents the hydrocarbon residue $R^1$ to $R^6$.

The proceeding of the polymerization by crosslinking the Si—H groups can be easily observed by using a Fourier transform infrared spectrophotometer to monitor the diffuse reflectance spectrum. As the crosslinking proceeds, the Si—H groups are extinguished. Thus, the proceeding can be observed by monitoring an absorption intensity at 2160 cm$^{-1}$ based on the stretching vibration of Si—H. Further, when the network structure is formed by such a crosslinking polymerization, a pyrogram of pyrolysis gas chromatography shows only the peaks of methane, ethane and other alkanes. Thus, the proceeding can be monitored thereby. Steric hindrance interferes with more than 80% of the proceeding of the crosslinking polymerization, even if reaction conditions (temperature, catalyst, etc.) are enhanced.

In the second way of the polymerization, breaking and re-bonding of a siloxane bond

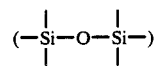

are repeated to form a macrocyclic silicone and/or extented linear silicone, as follows:

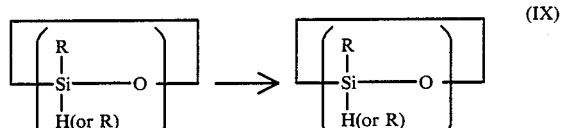 (IX)

or

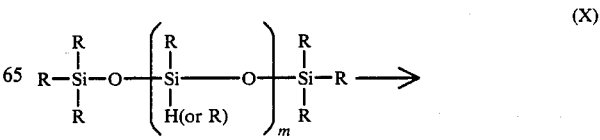 (X)

-continued

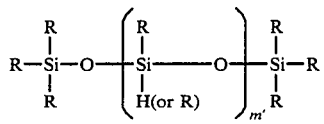

wherein R represents the meaning as given above, m is the sum of a and b, and m' is an integer greater than m.

The above polymerization is facilitated by the active sites (particularly, Brønsted acid site) on the surfaces of the particles. The proceeding of the above polymerization can be observed by determining that the absorption intensity has not dropped at 2160 cm$^{-1}$, based on the stretching vibration of Si—H in the monitoring diffuse reflectance spectrum using the Fourier transform infrared spectrophotometer, and a pyrogram of the pyrolysis gas chromatography shows the emergence of the macrocyclic and/or extended linear silicones having the value m' of about 4–30 in the above formulae.

Depending upon the kind of the particles used, or the reaction conditions (such as temperature, catalyst), two types of polymerization can proceed alone, or in combination. Further, the degree of polymerization may widely vary.

In the present invention, as explained above, the low molecular silicone compound is brought into contact with the particles. Thus, the silicone compound can adhere to or adsorb on substantially the entire surfaces of the particles and enter into the pores of the particles, a very thin film (3 Å to 30 Å) of the silicone polymer can be formed on the surfaces of the particles, after polymerization. Therefore, the porosity of the original particles remains, and still remains even after the subsequent crosslinking, addition reaction of the vinyl compound, and trimethylsilylating.

The (weight-average) molecular weight of the silicone polymer formed on the surfaces of the particles by the above two types of polymerization is more than 150,000. It is possible to ascertain that the molecular weight is more than 150,000, but so far, a means for more specifically determining the molecular weight thereof has not been discovered. As a silicone compound is polymerized to a high polymer, it becomes practically insoluble in water or an organic solvent. Thus, the molecular weight cannot be determined by extracting the silicone polymer. Further, it is impossible to measure the molecular weight of the silicone polymer coated on the surfaces of the particles.

Under these circumstances, the inventors of the present invention have employed the following procedure in order to estimate the (weight-average) molecular weight: At various stages before the polymerization had proceeded completely, the silicone polymer was extracted with chloroform. The extracts were analyzed by gel permeation chromatography and the molecular weights of the extracted polymers were determined in terms of those of polystyrene. Thus, the inventors were able to discover a resin having a maximum molecular weight of 150,000. Therefore, it can be said that the silicone polymer which is overpolymerized and is not extracted with chloroform has a molecular weight of more than 150,000.

The particles coated with silicone polymer as above can be packed into a column and used as a packing material for reversed phase liquid chromatography. For example, the packing material of the present invention comprising the particles treated with the silicone compound having the formula (I) wherein $R^1$ to $R^3$ (or $R^1$ to $R^6$) are methyl groups has a retention comparable to that of the conventional $C_1$-type packing material prepared by bonding trimethylchlorosilane to silica gel. The above coated particles are stable when a solvent inert to the Si—H group, (for example, acetonitrile) is used. If, however, an alcoholic solvent is passed as a mobile phase through the column packed with such particles having many residual Si—H groups, the alcohol is reacted with the residual Si—H groups to generate hydrogen, and the column is gradually deteriorated. It is a vital defect for a packing material that an alcoholic mobile phase cannot be used.

It has been found that a packing material which can be used stably for an alcoholic mobile phase can be prepared by crosslinking, in the presence of a catalyst, unreacted Si—H groups present in the silicone polymer on the surfaces of the particles after the polymerization treatment. As the catalyst for crosslinking, there may be used an alkaline catalyst such as sodium, potassium, calcium, ammonium or lithium hydroxide, or sodium carbonate; an alkyl metal catalyst such as dibutyltin; or an alkylamine catalyst such as tributylamine, or the like. The particles after this polymerization treatment are allowed to stand at room temperature or under heating, or heated under reflux, for 1 to 40 hours, in an aqueous, alcoholic or organic (e.g., acetone or actonitrile) solution containing about 0.01 to 10% by weight of the catalyst, and thus the residual Si—H groups are crosslinked as follows:

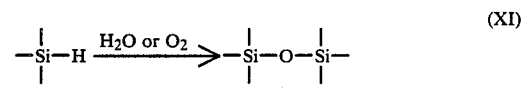

(XI)

An amount of the silicone compound to be applied on the surfaces of the particles is 1–50%, preferably 10–30% of the weight of the particles. When the amount is in excess of 50% by weight, the silicone compounds which are not sufficiently polymerized on the surfaces of the particles, but merely adsorbed thereto, is increased. Thus, the resulting particles are not suitable as a packing material. When the amount is less than 1% by weight, the entire surfaces of the particles cannot be covered with the film of the silicone polymer. Thus, the resulting particles have a low retention and are not suitable as a packing material. The amount, reaction conditions and the like used to cover the surfaces of the particles with a desired amount of the silicone compound can be easily determined by a pilot test.

The packing material of the present invention comprising the particles as prepared above has a retention comparable to that of the conventional bonded type packing material. For example, the former comprising the particles treated with the silicone compound of the formula (I) wherein $R^1$ to $R^3$ (or $R^1$ to $R^6$) are methyl groups is comparable to the conventional $C_1$-type material.

The present invention also provides a packing material for liquid chromatography, comprising particles having a silicone polymer film coated on substantially the entire surfaces thereof, this silicone polymer having the general formula (II):

(II)

wherein $R^1$ has the meaning as given above, t is an integer for making a weight-average molecular weight of the polymer more than 150,000, and x and y have the following relationships:

$$x+y=1, \text{ and}$$

$$0.6 \leq x \leq 1.$$

The above packing material can be prepared, for example, by bringing the cyclic silicone compound having the formula (VI):

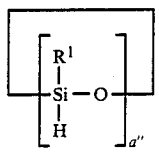
(VI)

wherein $R^1$ and $a''$ have the meanings as given above, into contact with the particles, whereby the silicone compound is polymerized on substantially the entire surfaces of the particles, and crosslinking unreacted Si—H groups in the presence of the above catalyst.

It can be estimated, in the same manner as explained above, that the molecular weight of the silicone polymer of the general formula (II) is more than 150,000.

The ratio of x to y in the above formula (II) can be determined by measuring the infrared diffuse reflectance spectrum using a Fourier transform infrared spectrophotometer. The procedure is based upon the fact that, as mentioned above, Si—H groups in the cyclic silicone compound are converted to —Si—O—Si— as the polymerization and crosslinking reactions proceed, and thus the Si—H groups are reduced:

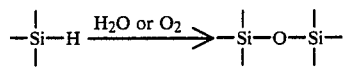
(XI)

In the infrared diffuse reflectance spectrum, the peak based on the stretching vibration of Si—H appears at 2160 cm$^{-1}$ at first and gradually decreases as the reactions proceed. Therefore, the ratio of x to y can be calculated from the ratio of the Si—H peak strength of the sample prior to the reactions to that of the sample after the reactions.

The sample prior to the reactions can be prepared by determining the weight increase due to the silicone polymer film formed after the reactions and mixing silica gel and the cyclic silicone compound of the formula (VI) in the amount corresponding to that weight increase under the conditions that the cyclic silicone compound does not polymerize. Then, 1 part by weight of the resulting sample prior to the reactions and 9 parts by weight of KBr powder are mixed, stirred, filled into a cell, and set on a sample carrier to measure the diffuse reflectance spectrum. From the spectrum, the peak strengths of Si—H groups at 2160 cm$^{-1}$ are determined, and then a calculation is performed in accordance with the following equations:

$$x=1.0-y$$

$$y=Y/X \quad \text{(XII)}$$

wherein X represents the Si—H peak strength of the sample prior to the reactions, and Y represents the Si—H peak strength of the sample after the reactions.

As described above, x and y satisfy the following equations:

$$x+y=1$$

$$0.6 \leq x \leq 1.$$

Nevertheless, the case wherein $0.7 \leq x \leq 0.9$ is preferable, and that wherein x is about 0.8 and thus y is about 0.2 is particularly preferable.

When the particles treated with the silicone compound of the formula (I) by means of the contacting and polymerization steps are crosslinked in the presence of the catalyst, silanol groups (Si—OH) may be slightly formed. A packing material containing silanol groups causes an irreversible adsorption with a highly polar compound, and so the function of a column packed with such a material is deteriorated.

It has now been found that a high quality packing material for reversed phase liquid chromatography can be obtained by trimethylsilylating the above Si—OH groups, after the crosslinking step, thereby blocking Si—OH groups and minimizing the influence thereof.

The trimethylsilylation is carried out by bringing the particles after the crosslinking step into contact with the agent capable of providing a trimethylsilyl group, in a vapour or liquid phase. For example, the particles are heated under reflux with stirring for 2 to 24 hours in a mixture of 0.5-3 parts (preferably, about 1 part) by weight of trimethylchlorosilane, 1-6 parts (preferably, about 2 parts) by weight of hexamethyldisilazane, and 1-8.5 parts (preferably, about 7 parts) by weight of pyridine. Alternatively, the particles may be heated in a closed vessel at about 40° to 150° C. together with one of trimethylchlorosilane, hexamethyldisilazane, trimethylmethoxysilane or trimethylethoxysilane.

Accordingly, there can be obtained a packing material applicable even for a high polar compound which cannot be dealt with in the conventional bonded type packing materials.

In reversed phase liquid chromatography, there are prevailingly employed packing materials having a higher retention than the $C_1$-type material, for example, the $C_{18}$-type (ODS-type), $C_8$-type and phenyl type packing materials. The inventors of the present invention have investigated the development of a packing material which is stable to an alcoholic mobile phase and has an excellent retention comparable to the conventional $C_{18}$-type packing materials or the like, and thus have completed a further invention.

It has been further found that a packing material having the desired properties as above can be obtained by carrying out an addition reaction of a vinyl compound to unreacted Si—H groups, after treating the particles with the silicone compound of the formula (I) by means of said contact and polymerization steps.

As the vinyl compound, there may be used, for example, a compound having the general formula (III):

(III)

wherein $R^8$ and $R^9$ represent, independently, a hydrogen atom, an alkyl group having 1 to 40 carbon atoms, a cycloalkyl or cycloalkenyl group having 4 to 8 carbon atoms, or an aryl group which may be substituted by one or more alkyl groups having 1 to 20 carbon atoms, and wherein said alkyl, cycloalkyl or cycloalkenyl group, or aryl group optionally substituted by one or more alkyl groups may be substituted by one or more halogen atoms, hydroxyl, carboxyl, amino, cyano, alkoxycarbonyl, aryloxycarbonyl and/or sulfonic acid groups.

The vinyl compounds of the formula (III) include an ethylene ($R^8$ and $R^9$ represent hydrogen), a vinyl compound such as α-olefin compound (one of $R^8$ and $R^9$ represents hydrogen, and the other represents a substituent other than hydrogen), a symmetric vinyl compound ($R^8$ and $R^9$ represent an identical substituent other than hydrogen), and an asymmetric vinyl compound ($R^8$ and $R^9$ represent different substituents other than hydrogen). It is preferable to use the vinyl compound of the formula (III) wherein $R^8$ and $R^9$ represent, independently, hydrogen; an alkyl group having 4–20 carbon atoms such as 1-hexyl, 1-octyl, 1-decyl, 1-dodecyl, 1-hexadecyl or 1-octadecyl; cyclohexyl or cyclohexenyl; phenyl or naphthyl; and phenyl or naphthyl substituted by a lower alkyl group having 1–4 carbon atoms.

The addition reaction carried out by using the vinyl compounds of the formula (III) wherein $R^8$ is hydrogen, and $R^9$ is ethyl, hexyl, hexadecyl or phenyl can result in the production of packing materials of the present invention which are comparable to the conventional bonded type $C_4$-type, $C_8$-type, $C_{18}$-type, or phenyl-type packing materials, respectively.

Another group of the preferable vinyl compounds comprises the compounds of the formula (III) wherein at least one of $R^8$ and $R^9$ represents a substituent other than hydrogen which is substituted by one or more functional groups (i.e., halogen or, hydroxyl, carboxyl, amino, cyano, alkoxycarbonyl, aryloxycarbonyl or sulfonic acid group). The addition of such a vinyl compound can result in a packing material for normal phase or ion exchange liquid chromatography.

A packing material for reversed phase liquid chromatography can be obtained from the addition of the vinyl compound without the above functional group.

As explained, the characteristics of the final packing material can be readily designed and controlled by appropriately selecting the vinyl compound used.

The addition reaction between the vinyl compound and the silicone polymer coated on the particle may be carried out by a known hydrosilylation. Reference is made, for example, to A. J. Chalk et. al., J. Am. Chem. Soc. 87, 16, 1965. The reaction may be carried out, for example, by bringing the vinyl compound in a vapor or liquid phase into contact with the silicone polymer coated on the particle surface, in the presence of a solvent at 50° to 300° C. for 2 hours or more.

A suitable catalyst is a platinum group catalyst such as a ruthenium, rhodium, palladium, osmium, iridium, or platinum compound. Preferably, a palladium or platinum compound is used. As the palladium catalyst, there may be mentioned palladium (II) chloride, palladium (II) oxide, palladium (II) hydroxide, etc. As the platinum catalyst, there may be mentioned platinum (II) chloride, tetrachloroplatinic acid, platinum (IV) chloride, hexachloroplatinic acid, hexachloroplatinic acid ammonium salt, platinum (II) oxide, platinum (II) hydroxide, platinum (IV) dioxide, platinum (IV) oxide, platinum (IV) disulfide, platinum (IV) sulfide, patassium hexachloroplatinate (IV), etc. Further, an organic solvent layer prepared by adding tri-$C_{1-8}$-alkylmethylammonium chloride and tri-$C_{1-8}$-alkylamine to the palladium or platinum compound and then extracting ion pairs in an aqueous/organic phase may be used. An alkylamine such as tributylamine may be used.

The reaction between the vinyl compound and Si—H groups present in the silicone polymer film on the surfaces of the particles can be observed by monitoring the diffuse reflectance spectrum by means of a Fourier transform infrared spectrophotometer. As the addition reaction of the vinyl compound proceeds, the absorption intensity at 2,160 cm$^{-1}$ based on the presence of Si—H groups considerably drops, whereas absorption based on the presence of alkyl groups emerges freshly at 2,800–3,000 cm$^{-1}$. Therefore, the degree of the reaction between the vinyl compound and Si-H groups in the silicone polymer film coated on the particle can be obtained from the following equation:

$$\text{degree of reaction (\%)} = 100 - \frac{\text{Si—H absorption intensity after reaction}}{\text{Si—H absorption intensity prior to reaction}} \times 100.$$

A packing material comprising the particles having the reaction degree of 60% or more can be used stably without generating hydrogen even if an alcoholic mobile phase passes through the column packed therewith.

An amount of the silicone polymer on the particle surfaces after the addition of the vinyl compound is 10 to 60%, preferably 20 to 40%, by weight with respect to the weight of the particle.

The present invention further provides a packing material for liquid chromatography, comprising particles having a silicone polymer film coated on substantially the entire surface thereof, the silicone polymer having the general formula (IV):

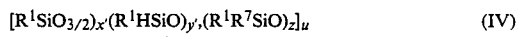

$$[R^1SiO_{3/2})_{x'}(R^1HSiO)_{y'}(R^1R^7SiO)_z]_u \qquad (IV)$$

wherein $R^1$ has the meaning as given above, $R^7$ represents a hydrocarbon residue having up to 42 carbon atoms, u is an integer for making a weight-average molecular weight of the polymer more than 150,000, and $x'$, $y'$ and $z$ have the following relationships:

$x' + y' + z = 1$, $0 \leq x' \leq 0.5$ $0 \leq y' \leq 0.4$, and $0.5 \leq z \leq 1.0$.

The above packing material can be prepared, for example, by bringing the cyclic silicone compound having the formula (VI):

(VI)

wherein $R^1$ and $a''$ have the meanings as given above, into contact with particles, whereby the silicone compound is polymerized on substantially the entire surface of the particles, and carrying out the addition reaction of the vinyl compound of the formula (III) to unreacted Si—H groups.

It can be estimated in the same manner as explained above that the molecular weight of the silicone polymer of the formula (IV) is more than 150,000.

The ratio of x', y' and z can be determined by measuring the infrared diffuse reflectance spectrum using a Fourier transform infrared spectrophotometer, as explained in relation with the formula (II). The ratio of $x(=x')$ and y is calculated from the abovementioned equation (XI) on a sample prior to the addition reaction of the vinyl compound. Then, with respect to samples before and after the addition reaction of the vinyl compound, each of the Si—H peak strengths at $2,160$ cm$^{-1}$ is measured. The ratio can be obtained from the following equation (XIII):

$$x' = 1.0 - y$$
$$y' = (Z/Y)Y \quad \text{(XIII)}$$
$$Z = 1.0 - x' - y'$$

wherein Y has the meaning as given above, and Z represents the Si—H peak strength of the sample after the addition of the vinyl compound.

As described above, x', y', and z have the following relationships:

$$x' + y' + z = 1,$$
$$0 \leq x' \leq 0.5$$
$$0 \leq y' \leq 0.4, \text{ and}$$
$$0.5 \leq z \leq 1.0.$$

However, the case wherein $0.1 \leq x' \leq 0.3$, $0.1 \leq y' \leq 0.3$, and $0.5 \leq z \leq 0.7$ is preferable, and the case wherein x' is about 0.2, y' is about 0.2, and z is about 0.6 is more preferable.

The packing materials for reversed phase liquid chromatography comprising the particles coated with 10 to 15% by weight of the silicone polymer of the formula (IV) have a good retention comparable to that of the conventional bonded type packing materials. For example, the present packing material comprising the particles coated with the silicone polymer of the formula (IV), wherein $R^1$ is methyl and $R^7$ is octadecyl, is comparable to the conventional $C_{18}$-type (ODS)-silica gel. Similarly, the case where $R^1$ is methyl and $R^7$ is octyl corresponds to the conventional $C_8$-type silica gel; the case where $R^1$ is methyl and $R^7$ is butyl corresponds to the conventional $C_4$-type silica gel; and the case where $R^1$ is methyl and $R^7$ is substituted phenethyl corresponds to the conventional phenyl-type silica gel.

By appropriately combining the substituents $R^1$ to $R^3$ or $R^1$ to $R^6$ in the silicone compound of the formula (I) and the substituents $R^8$ and $R^9$ in the vinyl compound of the formula (III), it is possible to obtain packing materials for liquid chromatography having widely varying degrees of retention which the conventional bonded type packing materials cannot exhibit.

The addition reaction of the vinyl compound as above, due to steric hindrance, results in some residual Si—H groups in the silicone polymer. A column containing any Si—H groups deteriorates with generating hydrogen when an alkaline (pH 8–14) mobile phase is used. It is therefore preferable to crosslink the residual Si—H groups as above. The crosslinking can be carried out in the same manner as explained above.

Further, it is preferable to analogously trimethylsilylate Si—OH groups which may be slightly formed in the crosslinking step.

The present packing material comprising the particles thus obtained, as explained, has a retention comparable to the conventional bonded type packing materials. Further, the present packing material has an excellent resistance to organic solvents, acids and alkalis, and is particularly stable during operation over a long term.

The packing material for liquid chromatography according to the present invention is essentially different from the conventional packing materials. The former is characterized by a resin-encapsulated type wherein the particle is uniformly coated with the silicone polymer and no chemical bond is formed between the particles and the silicone polymer, whereas the latter is characterized by such a chemical bond. By virtue of the resin-encapsulated type, the packing material of the present invention has a high quality without being substantially affected by any polar groups of the particles, such as silanol groups of silica gel.

Further, the alkaline mobile phase solvent which cannot be used in the conventional packing materials can be used in the present packing material. Thus, a scope of samples for analysis or purification can be broadened.

Furthermore, the characteristics of the present packing material can be freely designed and controlled by appropriately selecting the side chains in the starting silicone compound and/or the vinyl compound.

EXAMPLES

The present invention now will be further illustrated by, but is by no means limited to, the following Examples. In the following Examples, the term "molecular weight" denotes the weight-average molecular weight, unless otherwise indicated.

EXAMPLE 1

10 g of spherical silica gel particles having a average particle diameter of 5 μm and pores of about 100 Å, and 2 g of cyclic silicone compound having the formula (I) wherein $R^1=CH_3$, $a=3-5$, and $b=c=0$ were charged into two different vessels, respectively, and the two vessels were placed in a desiccator. After closing, the desiccator was allowed to stand in a thermostatic chamber at 80° C. for 7 hours, whereby, in the desiccator, the cyclic silicone compound in a vapor phase was brought into contact with the silica gel particles and polymerized all over the surfaces thereof. Then, the vessel containing silica gel particles was removed from the desiccator, and heated in a thermostatic chamber at 105° C. for 1 hour. After cooling, the particles were poured into a 300 ml beaker, 200 ml of a mixture of 0.01N sodium hydroxide and acetonitrile (2:1) was added, the particles were dispersed therein, and the whole was heated in a water bath for 2 hours. Then, filtration was carried out using a glass filter (G-4). Further, filtration and washing were performed with a mixture of water and acetonitrile (2:1) until the filtrate became neutral. After filtration, the cake was dried in a thermostatic chamber at 105° C. for 3 hours to yield particles coated with silicone polymer film. By measuring the infrared diffuse reflectance spectrum with a Fourier transform infrared spectrophotometer, the silicone polymer was assumed to have the following formula:

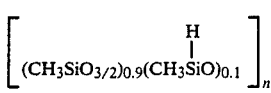

Less than 0.001% of the polymer was dissolved in chloroform. This proved that a molecular weight was more than 150,000.

3 g of the resulting particles were packed into a stainless steel column having an inner diameter of 4.6 mm and a length of 25 cm, using a packer and a pump, by means of an equilibrium slurry packing method to prepare a packed column.

The resulting column was connected to a high performance liquid chromatograph, and 30% methyl alcohol was run therethrough as a mobile phase at a rate of 1 ml/min. A standard mixture containing uracil, methyl benzoate, toluene, and naphthalene was poured. Absorptions were measured at 254 nm by an ultraviolet (UV) absorptiometer to obtain a chromatogram. The following table shows the retention time and the number of theoretical plates on each of the peaks:

|  | Retention time (min) | Number of theoretical plates |
| --- | --- | --- |
| Uracil | 3.2 | — |
| Methyl benzoate | 6.5 | 7600 |
| Toluene | 7.9 | 8200 |
| Naphthalene | 10.8 | 8100 |

EXAMPLE 2

In a 300 ml beaker, 10 g of irregular silica gel particles having an average particle diameter of 5 μm and pores of about 100 Å were charged, and then 100 ml of hexane and 4 g of a cyclic silicone compound having the formula (I) wherein $R^1=CH_3$, $a=80-100$, and $b=c=0$ were added. After evaporating the hexane in a water bath with stirring, the vessel was heated in a thermostatic chamber at 100° C. for 10 hours. After cooling, 200 ml of a mixture of 0.01N sodium hydroxide and acetonitrile (2:1) was added to the particles, the particles were dispersed therein, and the whole was heated in a water bath for 2 hours. Then, filtration was carried out using a glass filter (G-4). Further, filtration and washing were performed with a mixture of water and acetonitrile (2:1) until the filtrate became neutral. After filtration, the cake was dried in a thermostatic chamber at 105° C. for 3 hours to yield particles coated with silicone polymer film. Analyzing was made in the same manner as in Example 1, and the silicone polymer was assumed to have the following formula:

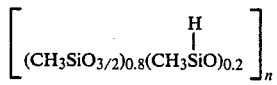

and a molecular weight of more than 150,000.

A packed column was prepared from the resulting particles in the same manner as in Example 1.

The resulting column was connected to a high performance liquid chromatograph, and 50% methyl alcohol was run therethrough as a mobile phase at a rate of 1 ml/min. A chromatogram was obtained in the same manner as in Example 1 with the same standard mixture as in Example 1. The retention time and the number of theoretical plates on each of the peaks were as follows:

|  | Retention time (min) | Number of theoretical plates |
| --- | --- | --- |
| Uracil | 3.2 | — |
| Methyl benzoate | 8.5 | 6500 |
| Toluene | 10.4 | 6700 |
| Naphthalene | 14.2 | 7100 |

EXAMPLE 3

In a 300 ml beaker, 10 g of spherical silica gel particles having an average particle diameter of 5 μm and pores of about 100 Å were charged, and then 100 ml of hexane and 2 g of cyclic silicone compound of the formula (I) wherein $R^1=C_6H_5$, $a=20-40$, and $b=c=0$ were added. After evaporating the hexane in a water bath with stirring, the vessel was heated in a thermostatic chamber at 180° C. for 10 hours. After cooling, the particles were treated in the same manner as in Example 2. Thus, a film of the silicone polymer having a molecular weight of more than 150,000 and the formula:

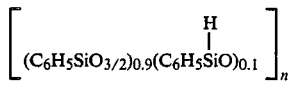

was formed on the particles.

A packed column was prepared from 3 g of the resulting particles and a stainless steel column having an inner diameter of 6 mm and a length of 15 cm, in the same manner as in Example 1.

The resulting column was connected to a high performance liquid chromatograph, and 50% methyl alcohol was run therethrough as a mobile phase at a rate of 1 ml/min. A chromatogram was obtained in the same manner as in Example 1, with the same standard mixture as in Example 1. The retention time and the number of theoretical plates on each of the peaks were as follows:

|  | Retention time (min) | Number of theoretical plates |
| --- | --- | --- |
| Uracil | 3.8 | — |
| Methyl benzoate | 11.5 | 7200 |
| Toluene | 13.2 | 7200 |
| Naphthalene | 22.6 | 7600 |

EXAMPLE 4

In a 300 ml beaker, 10 g of spherical silica gel particles having an average particle diameter of 10 μm and pores of about 100 Å were charged, and then 100 ml of hexane and 2.5 g of cyclic silicone compound of the formula (I) wherein $R^1=C_4H_9$, $a=3-10$, and $b=c=0$ were added. After evaporating the hexane in a water bath with stirring, the vessel was heated in a thermostatic chamber at 100° C. for 10 hours. After cooling, the particles were treated in the same manner as in Example 2. Thus, a film of the silicone polymer having a molecular weight of more than 150,000 and the formula

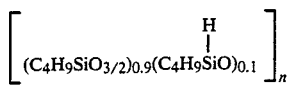

was formed on the particles.

A packed column was prepared from the resulting particles in the same manner as in Example 3.

The resulting column was connected to a high performance liquid chromatograph, and 70% methyl alcohol was run therethrough as a mobile phase at a rate of 1 ml/min. A chromatogram was obtained in the same manner as in Example 1, with the same standard mixture as in Example 1. The retention time and the number of theoretical plates on each of the peaks were as follows:

|  | Retention time (min) | Number of theoretical plates |
| --- | --- | --- |
| Uracil | 3.3 | — |
| Methyl benzoate | 6.5 | 5800 |
| Toluene | 8.5 | 6200 |
| Naphthalene | 10.7 | 6200 |

EXAMPLE 5

By using the silica gel particles and the cyclic silicone compound used in Example 1, polymerization on the surfaces of the particles was effected in a desiccator under the same conditions as in Example 1. A vessel containing the silica gel particles was removed from the desiccator, and heated in a thermostatic chamber at 105° C. for 1 hour. After cooling, the particles were taken into a 300 ml eggplant-shape flask, 1 mg of tri-n-octylmethylammonium chloroplatinate as a catalyst and 50 ml of 1-octene were added thereto, and the whole was heated under reflux in a water bath for 5 hours. Then, filtration was carried out using a glass filter (G-4). Further, filtration and washing were performed with 100 ml of chloroform and then 50 ml of methyl alcohol. Thereafter, the product was dried in a thermostatic chamber at 105° C. for 1 hour.

By measuring the infrared diffuse reflectance spectrum with a Fourier transform infrared spectrophotometer, the silicone polymer formed on the particle was assumed to have the following formula:

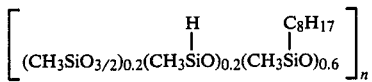

Because less than 0.001% of the polymer was dissolved in chloroform, a molecular weight was estimated to be more than 150,000.

A packed column was prepared from the resulting particles in the same manner as in Example 1, and a chromatogram was obtained in the same manner as in Example 4. The retention time and the number of theoretical plates on each of the peaks were as follows:

|  | Retention time (min) | Number of theoretical plates |
| --- | --- | --- |
| Uracil | 3.0 | — |
| Methyl benzoate | 5.7 | 12500 |
| Toluene | 8.0 | 13700 |
| Naphthalene | 9.4 | 13900 |

EXAMPLE 6

A film of the silicone polymer having a molecular weight of more than 150,000 and the formula:

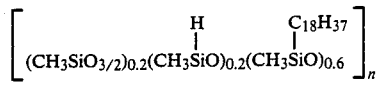

was formed on the particles in the same manner as in Example 5, except that 1 mg of the catalyst, 25 ml of carbon tetrachloride, and 25 ml of 1-octadecene were used instead of 5 mg of the catalyst, and 50 ml of 1-octene.

A packed column was prepared from the resulting particles in the same manner as in Example 1, and a chromatogram was obtained in the same manner as in Example 4. The retention time and the number of theoretical plates on each of the peaks were as follows:

|  | Retention time (min) | Number of theoretical plates |
| --- | --- | --- |
| Uracil | 2.9 | — |
| Methyl benzoate | 6.5 | 14100 |
| Toluene | 10.0 | 14700 |
| Naphthalene | 13.3 | 14900 |

EXAMPLE 7

A film of the silicone polymer having a molecular weight of more than 150,000 and the formula:

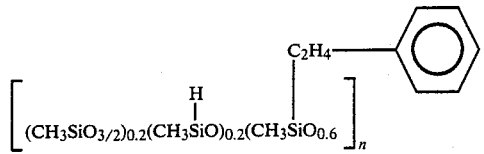

was formed on the particles in the same manner as in Example 5, except that 25 ml of carbon tetrachloride and ml of styrene were used instead of 50 ml of 1-octene.

A packed column was prepared from the resulting particles in the same manner as in Example 1, and a chromatogram was obtained in the same manner as in Example 2. The retention time and the number of theoretical plates on each of the peaks were as follows:

|  | Retention time (min) | Number of theoretical plates |
| --- | --- | --- |
| Uracil | 3.8 | — |
| Methyl benzoate | 11.5 | 12600 |
| Toluene | 13.1 | 13000 |
| Naphthalene | 20.4 | 13200 |

EXAMPLE 8

In a 300 ml beaker, 10 g of irregular silica gel particles having an average particle diameter of 10 μm and pores of about 50 Å were charged, and then 100 ml of hexane and 3 g of cyclic silicone compound of the formula (I) wherein $R^1=CH_3$, $a=30$–$50$, and $b=c=0$ were added. After evaporating the hexane in a water bath with stirring, the vessel was heated in a thermostatic chamber at 100° C. for 10 hours. After cooling, the particles were taken into a 300 ml eggplant-shape flask, 2 mg of chloroplatinic acid as a catalyst, 25 ml of carbon tetrachloride, and 25 ml of 1-docosene were added thereto, and the whole was heated under reflux in a bath at 150° C. for 5 hours. Then, filtration was carried out using a glass filter (G-4). Further, filtration and washing were performed with 100 ml of chloroform and then 50 ml of methyl alcohol. Thereafter, the product was dried in a thermostatic chamber at 105° C. for 1 hour.

Thus, a film of the silicone polymer having a molecular weight of more than 150,000 and the formula:

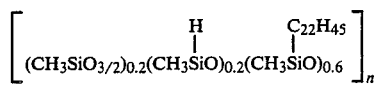

was formed on the particles.

A packed column was prepared from the resulting particles in the same manner as in Example 1, and a chromatogram was obtained in the same manner as in Example 4. The retention time and the number of theoretical plates on each of the peaks were as follows:

|  | Retention time (min) | Number of theoretical plates |
| --- | --- | --- |
| Uracil | 3.2 | — |
| Methyl benzoate | 6.9 | 12000 |
| Toluene | 12.3 | 12200 |
| Naphthalene | 16.5 | 13000 |

EXAMPLE 9

1 kg of irregular silica gel particles having an average particle diameter of 44–63 μm and pores of about 60 Å, and 200 g of cyclic silicone compound having the formula (I) wherein $R^1=CH_3$, $a=3$–$5$, and $b=c=0$ were charged into two different vessels, respectively. The two vessels were placed in a 30 l thermostatic chamber which can be closed and heated. After closing, the chamber was allowed to stand at 80° C. for 7 hours, whereby the cyclic silicone compound in a vapor phase was brought into contact with the silica gel particles and polymerized all over the surfaces thereof. After cooling, the particles were taken into a 5 l flask with a round bottom, 200 mg of tri-n-octylmethylammonium chloroplatinate as a catalyst and 1.5 l of 1-octene were added thereto, and the whole was heated under reflux at 120° C. for 10 hours by means of a mantle heater. Then, filtration was carried out using a glass filter (G-3). Further, filtration and washing were performed with 2 l of chloroform and then 5 l of methyl alcohol. Thereafter, the product was dried in a thermostatic chamber at 105° C. for 1 hour.

Thus, a film of the silicone polymer having a molecular weight of more than 150,000 and the formula:

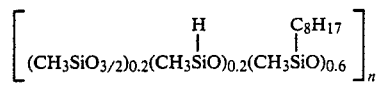

was formed on the particles.

A packed column was prepared from 750 g of the resulting particles and a stainless steel column having an inner diameter of 5 cm and a length of 50 cm in the same manner as in Example 1. The resulting column was connected to a preparative liquid chromatograph, and 85% methyl alcohol was run therethrough as a mobile phase at a rate of 100 ml/min. A standard mixture of 0.6 g of methyl benzoate and 1.2 g of toluene was poured into the column, and a differential refractometer was used to obtain a chromatogram. The retention time and the number of theoretical plates on each of the peaks were as follows:

|  | Retention time (min) | Number of theoretical plates |
| --- | --- | --- |
| Methyl benzoate | 9.2 | 1500 |
| Toluene | 11.0 | 1650 |

EXAMPLE 10

By using the silica gel particles and the cyclic silicone compound used in Example 1, polymerization on the surfaces of the particles was effected in a desiccator under the same conditions as in Example 1. A vessel containing the silica gel particles was removed from the desiccator, and heated in a thermostatic chamber at 105° C. for 1 hour. After cooling, the particles were taken into a 300 ml eggplant-shape flask, 1 mg of tri-n-octylmethylammonium chloroplatinate as a catalyst and 50 ml of 1-octadecene were added thereto, and the whole was heated under reflux in an oil bath at 120° C. for 5 hours. Then, filtration was carried out using a glass filter (G-4). Further, filtration and washing were performed with 100 ml of chloroform and then 50 ml of methyl alcohol. Thereafter, the particles were dried in a thermostatic chamber at 105° C. for 1 hour.

The dried particles were taken into a 300 ml eggplant-shape flask, 10 ml of 28% aqueous ammonia and 90 ml of methyl alcohol were added thereto, and the whole was heated under reflux in a water bath for 5 hours. Then, filtration was carried out using a glass filter (G-4). Further, filtration and washing were performed with 50 ml of methyl alcohol. Thereafter, the particles were dried in a thermostatic chamber at 105° C. for 3 hours.

Then, the dried particles were taken in a 300 ml eggplant-shape flask, 5 g of trimethylchlorosilane, 10 g of hexamethyldisilazane and 80 ml of pyridine were added thereto, and the whole was heated under reflux in a water bath for 4 hours. After cooling, 100 ml of water was added, and filtration was carried out using a glass filter (G-4). After filtration and washing with 50 ml of methyl alcohol, the particles were dried in a thermostatic chamber at 120° C. for 3 hours.

A packed column was prepared from the resulting particles in the same manner as in Example 1, and a chromatogram was obtained in the same manner as in Example 4. The retention time and the number of theoretical plates on each peak were as follows:

| | Retention time (min) | Number of theoretical plates |
|---|---|---|
| Uracil | 3.0 | — |
| Methyl benzoate | 7.0 | 14500 |
| Toluene | 10.5 | 15100 |
| Naphthalene | 15.0 | 15300 |

EXAMPLE 11

In a 300 ml beaker, 10 g of spherical silica gel particles having an average particle diameter of 5 μm and pores of about 100 Å were charged, and then 100 ml of hexane and 2.5 g of cyclic silicone compound having the formula (I) wherein $R^1=CH_3$, $a=30$–$50$, and $b=c=0$ were added. After evaporating the hexane in a water bath with stirring, the vessel was heated in a thermostatic chamber at 100° C. for 10 hours. After cooling, the particles were taken into a 300 ml eggplant-shape flask, 1 mg of tri-n-octylmethylammonium chloroplatinate as a catalyst and 50 ml of 1-octene were added thereto, and the whole was heated under reflux in a water bath for 5 hours. Then, filtration was carried out using a glass filter (G-4). Further, filtration and washing were performed with 100 ml of chloroform and then 50 ml of methyl alcohol. Thereafter, the particles were dried in a thermostatic chamber at 105° C. for 1 hour.

Therefore, the dried particles were crosslinked and trimethylsilylated in the same manner as in Example 10.

A packed column was prepared from the resulting particles in the same manner as in Example 1, and a chromatogram was obtained in the same manner as in Example 4. The retention time and the number of theoretical plates on each peak were as follows:

| | Retention time (min) | Number of theoretical plates |
|---|---|---|
| Uracil | 3.0 | — |
| Methyl benzoate | 5.8 | 15300 |
| Toluene | 8.1 | 15100 |
| Naphthalene | 9.5 | 15500 |

EXAMPLE 12

10 g of spherical silica gel particles having an average particle diameter of 5 μm and pores of about 100 Å, and 2 g of cyclic silicone compound having the formula (I) wherein $R^1=R^2=R^3=CH_3$, $a=1$–$3$, $b=1$–$3$, $a+b=3$–$5$ and $c=0$ were charged into two different vessels, respectively, and the two vessels were placed in a desiccator. After closing, the desiccator was allowed to stand in a thermostatic chamber at 80° C. for 7 hours, whereby, in the desiccator, the cyclic silicone compound in a vapor phase was brought into contact with the silica gel particles and polymerized all over the surfaces thereof. Then, the vessel containing silica gel particles was removed from the desiccator, and heated in a thermostatic chamber at 105° C. for 1 hour. After cooling, the particles were taken into a 300 ml eggplant-shape flask, 1 mg of tri-n-octylmethylammonium chloroplatinate as a catalyst and 50 mg of 1-octadecene were added thereto, and the whole was heated under reflux in an oil bath at 120° C. for 5 hours. Then, filtration was carried out using a glass filter (G-4). Further, filtration and washing were performed with 100 ml of chloroform and then 50 ml of methyl alcohol. Thereafter, the particles were dried in a thermostatic chamber at 105° C. for 1 hour.

Thereafter, the dried particles were crosslinked and trimethylsilylated in the same manner as in Example 10.

A packed column was prepared from the resulting particles in the same manner as in Example 1, and a chromatogram was obtained in the same manner as in Example 4. The retention time and the number of theoretical plates on each peak were as follows:

| | Retention time (min) | Number of theoretical plates |
|---|---|---|
| Uracil | 3.1 | — |
| Methyl benzoate | 7.2 | 17000 |
| Toluene | 10.8 | 16800 |
| Naphthalene | 15.5 | 17200 |

EXAMPLE 13

10 g of spherical silica gel particles having an average particle diameter of 5 μm and pores of about 100 Å, and 3 g of linear silicone compound having the formula (I) wherein $R^1=R^4=R^5=R^6=CH_3$, $a=3$–$10$, $b=0$, and $c=2$ were charged into two different vessels, respectively, and the two vessels were placed in a desiccator. After closing, the desiccator was allowed to stand in a thermostatic chamber at 100° C. for 16 hours, whereby, in the desiccator, the linear silicone compound in a vapor phase was brought into contact with the silica gel particles and polymerized all over the surfaces thereof. Then, the vessel containing silica gel particles was removed from the desiccator, and heated in a thermostatic chamber at 105° C. for 1 hour. After cooling, the particles were taken into a 300 ml eggplant-shape flask, 1 mg of tri-n-octylmethylammonium chloroplatinate as a catalyst and 50 ml of 1-octadecene were added thereto, and the whole was heated under reflux in a water bath for 5 hours. Then, filtration was carried out using a glass filter (G-4). Further, filtration and washing were performed with 100 ml of chloroform and then 50 ml of methyl alcohol. Thereafter, the particles were dried in a thermostatic chamber at 105° C. for 1 hour.

Thereafter, the dried particles were crosslinked and trimethylsilylated in the same manner as in Example 10.

A packed column was prepared from the resulting particles in the same manner as in Example 1, and a chromatogram was obtained in the same manner as in Example 4. The retention time and the number of theoretical plates on each peak were as follows:

| | Retention time (min) | Number of theoretical plates |
|---|---|---|
| Uracil | 3.0 | — |
| Methyl benzoate | 6.9 | 15100 |
| Toluene | 10.2 | 14900 |
| Naphthalene | 14.8 | 15200 |

EXAMPLE 14

In a 300 ml beaker, 10 g of spherical silica gel particles having an average particle diameter of 5 μm and pores of about 100 Å were charged, and then 100 ml of hexane and 2 g of linear silicone compound having the formula (I) wherein $R^1=R^4=R^5=R^6=CH_3$, $a=20$–$40$, $b=0$, and $c=2$ were added. After evaporating the hexane in a water bath with stirring, the vessel was heated in a thermostatic chamber at 120° C. for 10 hours. After cooling, the particles were taken into a 300 ml eggplant-shape flask, 1 mg of tri-n-octylmethylammonium chloroplatinate as a catalyst and 50 ml of 1-octene were added thereto, and the whole was heated under reflux in a water bath for 5 hours. Then, filtration was carried out using a glass filter (G-4). Further, filtration and washing were performed with 100 ml of chloroform and then 50 ml of methyl alcohol. Thereafter, the particles were dried in a thermostatic chamber at 105° C. for 1 hour.

Thereafter, the dried particles were crosslinked and trimethylsilylated in the same manner as in Example 10.

A packed column was prepared from the resulting particles in the same manner as in Example 1, and a chromatogram was obtained in the same manner as in Example 4. The retention time and the number of theoretical plates on each peak were as follows:

|  | Retention time (min) | Number of theoretical plates |
| --- | --- | --- |
| Uracil | 2.9 | — |
| Methyl benzoate | 5.7 | 16000 |
| Toluene | 8.0 | 16300 |
| Naphthalene | 9.5 | 16500 |

EXAMPLE 15

10 g of irregular silica gel particles having an average particle diameter of 10 μm and pores of about 50 Å, and 2 g of linear silicone compound having the formula (I) wherein $R^1$ to $R^6=CH_3$, a=1-3, b=1-3, a+b=3-5, and c=2 were charged into two different vessels, respectively, and the two vessels were placed in a desiccator. After closing, the desiccator was allowed to stand in a thermostatic chamber at 100° C. for 7 hours, whereby, in the desiccator, the linear silicone compound in a vapor phase was brought into contact with the silica gel particles an polymerized all over the surfaces thereof. Then, the vessel containing silica gel particles was removed from the desiccator, and heated in a thermostatic chamber at 105° C. for 1 hour. After cooling, the particles were taken into a 300 ml eggplant-shape flask. 1 mg of tri-n-octylmethylammonium chloroplatinate as a catalyst and 50 ml of 1-octadecene were added thereto, and the whole was heated under reflux in a water bath for 5 hours. Then, filtration was carried out using a glass filter (G-4). Further, filtration and washing were performed with 100 ml of chloroform and then 50 ml of methyl alcohol. Thereafter, the particles were dried in a thermostatic chamber at 105° C. for 1 hour.

Thereafter, the dried particles were crosslinked and trimethylsilylated in the same manner as in Example 10.

A packed column was prepared from the resulting particles in the same manner as in Example 1, and a chromatogram was obtained in the same manner as in Example 4. The retention time and the number of theoretical plates on each peak were as follows:

|  | Retention time (min) | Number of theoretical plates |
| --- | --- | --- |
| Uracil | 3.1 | — |
| Methyl benzoate | 7.5 | 7800 |
| Toluene | 11.2 | 8000 |
| Naphthalene | 16.0 | 8100 |

EXAMPLE 16

1 kg of irregular silica gel particles having a particle diameter of 25–44 μm and pores of about 120 Å, and 200 g of linear silicone compound having the formula (I) wherein $R^1=R^4=R^5=R^6=CH_3$, a=1-3, b=1-3, a+b=3-5, and c=2 were charged into two different vessels, respectively, and the two vessels were placed in a large desiccator. After closing, the desiccator was allowed to stand in a thermostatic chamber at 80° C. for 16 hours, whereby, in the desiccator, the linear silicone compound in a vapor phase was brought into contact with the silica gel particles and polymerized all over the surfaces thereof. Then, the vessel containing silica gel particles was removed from the desiccator, and heated in a thermostatic chamber at 105° C. for 3 hours. After cooling, the particles were taken into a 5 l flask with a round bottom. 100 mg of tri-n-octylmethylammonium chloroplatinate as a catalyst and 2 l of 1-octene were added thereto, and the whole was heated under reflux in a bath for 5 hours. Then, filtration was carried out using a glass filter (G-4). Further, filtration and washing were performed with 5 l of chloroform and then 1 l of methyl alcohol. Thereafter, the product was dried in a thermostatic chamber at 105° C. for 1 hour.

The dried particles were taken into a 5 l flask with a round bottom, 0.2 l of 28% aqueous ammonia and 1.8 l of methyl alcohol were added thereto, and the whole was heated under reflux in a water bath for 5 hours. Then, filtration was carried out using a glass filter (G-4). Further, filtration and washing were performed with 1 l of methyl alcohol. Thereafter, the particles were dried in a thermostatic chamber at 105° C. for 3 hours.

Then, the dried particles were taken in a 5 l flask with a round bottom, 100 g of trimethylchlorosilane, 200 g of hexamethyldisilazane and 1.8 l of pyridine were added thereto, and the whole was heated under reflux in a water bath for 4 hours. After cooling, 2 l of water was added, and filtration was carried out using a glass filter (G-4). After filtration and washing with 1 l of methyl alcohol, the particles were dried in a thermostatic chamber at 120° C. for 3 hours.

A packed column was prepared from 750 g of the resulting particles and a stainless steel column having an inner diameter of 5 cm and a length of 50 cm in the same manner as in Example 1. The resulting column was connected to a preparative liquid chromatograph, and 85% methyl alcohol was run therethrough as a mobile phase at a rate of 100 ml/min. A standard mixture of methyl benzoate and toluene was poured into the column, and an ultraviolet photometric detector was used at 254 nm to obtain a chromatogram. The retention time and the number of theoretical plates on each of the peaks were as follows:

|  | Retention time (min) | Number of theoretical plates |
| --- | --- | --- |
| Methyl benzoate | 9.0 | 2500 |
| Toluene | 10.8 | 2700 |

EXAMPLE 17

In a 300 ml beaker, 10 g of irregular silica gel particles having an average particle diameter of 5 μm and pores of about 100 Å were charged, and then 100 ml of hexane and 4 g of linear silicone compound having the formula (I) wherein $R^1=R^4=R^5=R^6=CH_3$, a =80-100, b=0, and c=2 were added. After evaporating the hexane in a water bath with stirring, the vessel was heated in a thermostatic chamber at 100° C. for 10 hours. After cooling, 200 ml of a mixture of 0.01N sodium hydroxide and acetonitrile (2:1) was added to the particles, the particles were dispersed therein, and the whole was heated in a water bath for 2 hours. Then, filtration was carried out using a glass filter (G-4). Further, the filtration and washing were performed with a mixture of water and acetonitrile (2:1) until the filtrate became neutral. Thereafter, the particles were dried in a thermostatic chamber at 105° C. for 3 hours.

Then, the dried particles were trimethylsilylated in the same manner as in Example 10.

A packed column was prepared from the resulting particles in the same manner as in Example 1, and a chromatogram was obtained in the same manner as in Example 2. The retention time and the number of theoretical plates on each peak were as follows:

|  | Retention time (min) | Number of theoretical plates |
|---|---|---|
| Uracil | 3.0 | — |
| Methyl benzoate | 8.2 | 8000 |
| Toluene | 10.3 | 8200 |
| Naphthalene | 14.4 | 8100 |

EXAMPLE 18

In a 300 ml beaker, 10 g of spherical silica gel particles having an average particle diameter of 10 μm and pores of about 100 Å were charged, and then 100 ml of hexane and 2.5 g of linear silicone compound having the formula (I) wherein $R^1=R^4=R^5=R^6=C_4H_9$, a=3–10, b=0, and c=2 were added. After evaporating the hexane in a water bath with stirring, the vessel was heated in a thermostatic chamber at 100° C. for 10 hours.

Thereafter, the particles after drying were crosslinked and trimethylsilylated in the same manner as in Example 10.

A packed column was prepared from the resulting particles in the same manner as in Example 1, and a chromatogram was obtained in the same manner as in Example 2. The retention time and the number of theoretical plates on each peak were as follows:

|  | Retention time (min) | Number of theoretical plates |
|---|---|---|
| Uracil | 3.2 | — |
| Methyl benzoate | 6.4 | 6000 |
| Toluene | 8.3 | 6200 |
| Naphthalene | 10.5 | 6100 |

Characteristics of Packing Materials of Present Invention

The packing material for liquid chromatography according to the present invention has various properties superior to those of the conventional bonded type packing materials.

As explained above, the conventional bonded type packing materials contain about 10–20% of residual Si—OH groups, which considerably affect the elution of polar substances, particularly basic substances. To the contrary, the present packing material is the resin-encapsulated type, and thus Si—OH groups are completely encapsulated. Therefore, a substantial influence of Si—OH groups can be avoided.

Further, the present packing material can avoid tailing in the elution of polar substances, unlike the conventional materials which have this disadvantage.

Furthermore, the present packing material has a good retention and a high resolution similar to those of a $C_{18}$-type or $C_8$-type packing material. The latter conventional materials are used in about 80% of packed columns for reversed phase liquid chromatography, because of their good retention and resolution.

In addition, the present packing material (wherein the silica gel is covered with the uniform film of the silicone polymer) has a particularly high resistance to alkali, and can be operated in pH 2 to 12 conditions over a long term.

COMPARATIVE EXAMPLE

The following comparative examples illustrate the characteristics of the present packing materials, without limiting a scope of the present invention.

COMPARATIVE EXAMPLE 1

In this example, the present packing materials were compared with a conventional $C_{18}$-type material with respect to the retention and resolution thereof.

As columns filled with the packing materials of the present invention, the packed columns prepared in Examples 6 and 5 were employed.

As a control column, a commercially available column filled with ODS silica gel ($C_{18}$-type) packing material [hereinafter referred to as "Column by N. Co."] was employed.

Figure 2:
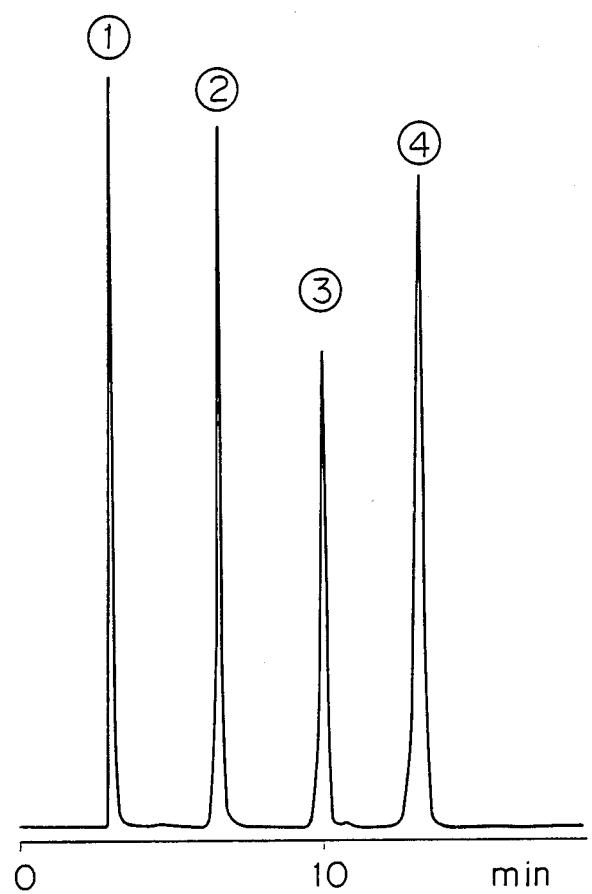
FIGS. 2 and 3 show chromatograms resulting from resin-encapsulated type packing materials in accordance with the present invention.
Figure 3:
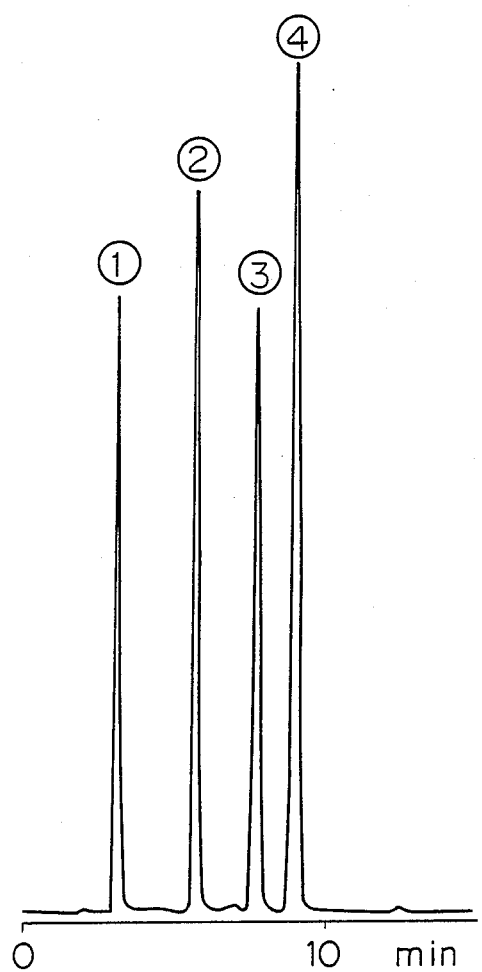

Each of the above columns was connected to a high performance liquid chromatograph. As a mobile phase, 70% methyl alcohol was run at a rate of 1 ml/min. A standard mixture of uracil, methyl benzoate, toluene, and naphthalene was poured into each column and an ultraviolet photometric detector was used at 254 nm to obtain chromatograms. FIG. 1 shows a chromatogram resulting from the conventional ODS packing material. FIGS. 2 and 3 show chromatograms resulting from the present packing materials of Examples 6 and 5, respectively. In FIGS. 1 to 3, ① denotes a peak of uracil, ② denotes a peak of methyl benzoate, ③ denotes a peak of toluene, and ④ denotes a peak of naphthalene. FIGS. 1 and 2 show that the column filled with the packing material of Example 6 according to the present invention has a retention and resolution similar to those exhibited by the column packed with the conventional bonded type material. Further, the column packed with the material of Example 5 according to the present invention has a retention slightly lower than those of Example 6 and the control, but comparable to that of the conventional bonded type $C_8$-type material.

COMPARATIVE EXAMPLE 2

In this example, the resin encapsulated type packing materials of the present invention were compared with several conventional bonded type packing materials with respect to influence of Si—OH groups.

As the packing materials of the present invention, the materials prepared in Examples 5, 6, 10, 12, 13, and 15 were employed. As the conventional materials, 10 packed columns, each sold in the form of a column packed with a conventional bonded type packing material, were employed. The conventional packing materials are listed in the following Table 1. Further, the packing materials treated with trimethylsilylation (TMS-treatment) are distinguished from those not treated with TMS in Table 1, by symbols "+" (with) and "−" (without).

Similar to the commercially available columns, 3 g of each of the packing materials of the present invention was packed into a stainless steel column (inner diameter of 4.6 mm; length of 25 cm) by means of an equilibrium slurry packing method to prepare a packed column. Each of the columns was connected to a high performance liquid chromatograph. A "pyridine-phenol test" was carried out by running 15% acetonitrile as a mobile phase therethrough at a rate of 1 ml/min and using a chart speed of 5 mm/min. The "pyridine-phenol test" is used to analyze a mixture of pyridine and phenol by means of a high performance liquid chromatography, determine retention times ($T_R$), and calculate a value of $T_R$-pyridine/$T_R$-phenol therefrom. The value shows that the more the value exceeds 1, the larger the number of Si—OH groups remaining, and thus the influence on a polar substance is increased.

In addition, the tailing of an elution peak of pyridine was evaluated for each of the columns in 5 grades as follows:
5 ... very wide (very bad),
4 ... wide (bad),
3 ... normal (normal),
2 ... narrow (good),
1 ... very narrow (excellent).

Further, a total evaluation was made from the results of the "pyridine-phenol test" and the above tailing test, in 3 grades (A ... good; B ... normal; C ... bad), as listed in Table 1.

The results shows that, in comparison with the commercially available bonded type packing materials, the resin-encapsulated type packing materials for reversed phase liquid chromatography of the present invention is not considerably affected by Si—OH groups and has excellent properties.

TABLE 1

| Packing material | TMS-treatment | $T_R$-pyridine/$T_R$-phenol | Tailing of pyridine peak | Total evaluation |
|---|---|---|---|---|
| ODS-silica gel ($C_{18}$-type) [N. Co.] | − | 3.99 | 5 | C |
| ODS-silica gel ($C_{18}$-type) [Y. Co.]-No. 1 | − | 3.06 | 4 | C |
| ODS-silica gel ($C_{18}$-type) [S. Co.]-No. 1 | − | 4.75 | 5 | C |
| ODS-silica gel ($C_{18}$-type) [S. Co.]-No. 2 | − | 6.05 | 5 | C |
| ODS-silica gel ($C_{18}$-type) [T. Co.]-No. 1 | − | 3.88 | 4 | C |
| ODS-silica gel ($C_{18}$-type) [Y. Co.]-No. 2 | + | 0.55 | 3 | B |
| ODS-silica gel ($C_{18}$-type) [T. Co.]-No. 2 | + | 0.58 | 3 | B |
| ODS-silica gel ($C_{18}$-type) [Y. Co.]-No. 3 | − | 2.06 | 4 | C |
| ODS-silica gel ($C_{18}$-type) [S. Co.]-No. 3 | − | 2.55 | 4 | C |
| ODS-silica gel ($C_{18}$-type) [G. Co.] | − | 0.53 | 2 | B |
| Example 5 | − | 0.58 | 1 | A |
| Example 6 | − | 0.42 | 1 | A |
| Example 10 | + | 0.42 | 1 | A |
| Example 12 | + | 0.33 | 1 | A |
| Example 13 | + | 0.35 | 1 | A |
| Example 15 | + | 0.41 | 1 | A |

COMPARATIVE EXAMPLE 3

In this example, the resin-encapsulated type packing materials of the present invention were compared with several conventional bonded type packing materials with respect to a resistance to alkali.

As the packing materials of the present invention, the materials prepared in Examples 10, 12, 13, and 15 were employed. As the conventional materials, 6 packed columns, each sold in the form of a column packed with a conventional bonded type packing material, were employed. Similar to the commercially available columns, 3 g of each of the packing materials of the present invention was packed into a stainless steel column (inner diameter of 4.6 mm; length of 25 cm) by means of an equilibrium slurry packing method to prepare a packed column. Each of the columns was connected to a automatic high performance liquid chromatograph. As a mobile phase, 70% methyl alcohol adjusted to pH 10 with Britton-Robinson buffer was run therethrough at 1 ml/min, and a naphthalene reference substance was poured into each column to obtain a chromatogram. The above procedure was repeated in an automatic manner to determine a time in which a retention time of a peak of a naphthalene is reduced by 2 minutes during continuous operation. It is considered that, in a commercially available bonded type packing material, a flow of pH 8 or more for more than a certain period of time results in deterioration of a column and reduction of retention.

The test results are listed in Table 2. The Table shows that, in comparison with the commercially available packed columns, the packed columns filled with the resin-encapsulated type materials of the present invention are durable for a considerably long term continuous operation, and have an excellent resistance to alkali.

TABLE 2

| Packing material | Continuous operation time (hour) |
|---|---|
| Example 10 | 155 |
| Example 12 | 130 |
| Example 13 | 146 |
| Example 15 | 172 |
| ODS-silica gel ($C_{18}$-type) [N. Co.] | 38 |
| ODS-silica gel ($C_{18}$-type) [Y. Co.]-No. 1 | 55 |
| ODS-silica gel ($C_{18}$-type) [S. Co.]-No. 1 | 58 |
| ODS-silica gel ($C_{18}$-type) [S. Co.]-No. 2 | 40 |
| ODS-silica gel ($C_{18}$-type) [T. Co.]-No. 2 | 60 |
| ODS-silica gel ($C_{18}$-type) [G. Co.] | 45 |

We claim:

1. A process for the manufacture of a packing material for liquid chromatography, comprising particles having a silicone polymer film coated on substantially the entire surface thereof, said process comprising the steps of:
    (a) bringing at least one silicone compound having the general formula (I):

$(R^1HSiO)_a(R^2R^3SiO)_b(R^4R^5R^6SiO_{\frac{1}{2}})_c$     (I)

wherein $R^1$, $R^2$, and $R^3$ represent, independently, a hydrocarbon residue having 1 to 10 carbon atoms, which may be substituted with at least one halogen atom, $R^4$, $R^5$, and $R^6$ represent, independently, hydrogen or a hyrocarbon residue baving 1 to 10 carbon atoms, which may be substituted with at least one halogen atom, a is zero or an integer of 1 or more, b is zero or an integer of 1 or more, c is zero or 2, and a+b+c is 3 to 300, with the proviso that, when c is zero, b is an integer of 1 or more, into contact with particles, whereby the silicone compound is polymerized on substantially the entire surface of the particles, and
    (b) crosslinking unreacted Si—H groups in the presence of a catalyst.

2. A process according to claim 1, further comprising the step of:
    (c) trimethylsilylating Si—OH groups formed slightly in said step (b) with an agent capable of providing a trimethylsilyl group.

3. A process according to claim 1, wherein the silicone compound having the general formula (I) is brought into contact with particles having an average particle size of 3-1000 μm and pores of 30-1000 Å, selected from a group consisting of silica gel, alumina, glass bead, zeolite, hydroxyapatite, graphite and composite particles.

4. A process according to claim 1, wherein, in step (a), a silcone compound having the general formula (I) in a vapor phase is brought into contact with the particles.

5. A process according to claim 1, wherein, in step (b), an alkaline, alkyl metal or alkylamine catalyst is used as the catalyst.

6. A process according to claim 1, wherein the resulting packing material comprises particles having the silicone polymer film coated thereon of a thickness of 3 Å to 30 Å.

7. A process for the manufacture of a packing material for liquid chromatography, comprising particles having a silicone polymer film coated on substantially the entire surface thereof, said process comprising the steps of:
    (a) bringing at least one silicone compound having the general formula (I):

$(R^1HSiO)_a(R^2R^3SiO)_b(R^4R^5R^6SiO_{\frac{1}{2}})_c$     (I)

wherein $R^1$, $R^2$, and $R^3$ represent, independently, a hydrocarbon residue having 1 to 10 carbon atoms, which may be substituted with at least one halogen atom, $R^4$, $R^5$, and $R^6$ represent, independently, hydrogen or a hydrocarbon residue having 1 to 10 carbon atoms, which may be substituted with at least one halogen atom, a is zero or an integer of 1 or more, b is zero or an integer of 1 or more, c is zero or 2, and a+b+c is 3 to 300, with the proviso that, when c is zero, b is an integer of 1 or more, into contact with particles, whereby the silicone compound is polymerized on substantially the entire surface of the particles, and
    (b) carrying out an addition reaction of a vinyl compound having up to 40 carbon atoms to unreacted Si—H groups.

8. A process according to claim 7, further comprising the step of:
    (c) crosslinking unreacted Si—H groups in the presence of a catalyst.

9. A process according to claim 8, further comprising the step of:
    (d) trimethylsilylating Si—OH groups formed slightly in said step (c) with an agent capable of providing a trimethylsilyl group.

10. A process according to claim 8, wherein, in step (c), an alkaline, alkyl metal or alkylamine catalyst is used as the catalyst.

11. A process according to claim 7, wherein the silicone compound having the general formula (I) is brought into contact with particles having an average particle size of 3-1000 um and pores of 30-1000 Å, and selected from a group consisting of silica gel, alumina, glass bead, zeolite, hydroxyapatite, graphite and composite particles.

12. A process according to claim 7, wherein, the step (a), a silicone compound having the general formula (I) in a vapor phase is brought into contact with the particles.

13. A process according to claim 7, wherein, in the step (b), a vinyl compound having the general formula (III):

$R^8-CH=CH-R^9$     (III)

wherein $R^8$ and $R^9$ represent, independently, a hydrogen atom, an alkyl group having 1 to 40 carbon atoms, a cycloalkyl or cycloalkenyl group having 4 to 8 carbon atoms, or an aryl group which may be substituted by one or more alkyl groups having 1 to 20 carbon atoms, and wherein said alkyl, cycloalkyl or cycloalkenyl group, or aryl group optionally substituted by one or more alkyl groups may be substituted by one or more halogen atoms, hydroxyl, carboxyl, amino, cyano, alkoxycarbonyl, aryloxycarbonyl and/or sulfonic acid groups, is used as the vinyl compound.

14. A method for making a liquid chromatographic separation of components contained in a liquid sample which comprises contacting the liquid sample with a chromatographic column containing a packing material comprising particles having a silicone polymer film coated on substantially the entire surface thereof, said packing material being produced by a process comprising the steps of:
    (a) bringing at least one silicone compound having the general formula (I):

$(R^1HSiO)_a(R^2R^3SiO)_b(R^4R^5R^6SiO_{\frac{1}{2}})_c$     (I)

wherein $R^1$, $R^2$, and $R^3$ represent, indepently, a hydrocarbon residue having 1 to 10 carbon atoms, which may be substituted with at least one halogen atom, $R^4$, $R^5$, and $R^6$ represent, independently, hydrogen or a hydrocarbon residue having 1 to 10 carbon atoms, which may be substituted with at least one halogen atom, a is zero or an integer of 1 or more, b is zero or an integer of 1 or more, c is zero or 2, and a+b+c is 3 to 300, with the proviso that, when c is zero, b is an integer of 1 or more, into contact with particles, whereby the silicone compound is polymerized on substantially the entire surface of the particles, and (b) crosslinking unreacted Si—H groups in the presence of a catalyst.

15. A method according to claim 14, wherein the above process further comprises the step of:

(c) trimethylsilylating Si—OH groups formed slightly in said step (b) with an agent capable of providing a trimethylsilyl group.

16. A method for making a liquid chromatographic separation of components contained in a liquid sample which comprises contacting the liquid sample with a chromatographic column containing a packing material comprising particles having a silicone polymer film coated on substantially the entire surface thereof, said packing material being produced by a process comprising the steps of:

(a) bringing at least one silicone compound having the general formula (I):

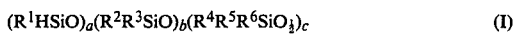

$(R^1HSiO)_a(R^2R^3SiO)_b(R^4R^5R^6SiO_{\frac{1}{2}})_c$     (I)

wherein $R^1$, $R^2$, and $R^3$ represent, independently, a hydrocarbon residue having 1 to 10 carbon atoms, which may be substituted with at least one halogen atom, $R^4$, $R^5$, and $R^6$ represent, independently, hydrogen or a hydrocarbon residue having 1 to 10 carbon atoms, which may be substituted with at least one halogen atom, a is zero or an integer of 1 or more, b is zero or an integer of 1 or more, c is zero or 2, and a+b+c is 3 to 300, with the proviso that, when c is zero, b is an integer of 1 or more, into contact with particles, whereby the silicone compound is polymerized on substantially the entire surface of the particles, and (b) carrying out an addition reaction of a vinyl compound having up to 40 carbon atoms to unreacted Si—H groups.

17. A method according to claim 16, wherein the above process further comprises the step of:

(c) crosslinking unreacted Si—H group in the presence of a catalyst.

18. A method according to claim 17, wherein the above process further comprises the step of:

(d) trimethylsilylating Si—OH groups formed slightly in said step (c) with an agent capable of providing a trimethylsilyl group.

19. A process for the manufacture of a packing material for reversed phase liquid chromatography, comprising particles having a silicone polymer film coated on substantially the entire surface thereof, said process comprising the steps of:

(a) bringing a cyclic silicone compound having the general formula (VI):

(VI)

wherein $R^1$ represents a lower alkyl or aryl group, and a″ is an integer of 3 to 100, into contact with particles, whereby the silicone compound is polymerized on substantially the entire surface of the particles, and (b) crosslinking unreacted Si—H groups in the presence of a catalyst, thereby producing the particles having the silicone polymer coated on substantially the entire surface thereof, said silicone polymer having the general formula (II):

$[(R^1SiO_{3/2})_x(R^1HSiO)_y]_t$     (II)

wherein $R^1$ has the meaning as given above, t is an integer for making a molecular weight of the polymer more than 150,000, and x and y have the following relationships:

$x+y=1$, and $0.6 \leq x < 1$.

20. A process according to claim 19, wherein the silicone compound having the general formula (VI) is brought into contact with particles selected from a group consisting of silica gel, alumina, glass bead and zeolite.

21. A process according to claim 20, wherein the silica gel having a particle size of 3–500 μm and pores of 50–500 Å is used.

22. A process according to claim 19, wherein, in step (a), a silicone compound having the general formula (VI) in a vapor phase is brought into contact with the particles.

23. A process according to claim 19, wherein, in step (b), an alkaline or alkyl metal catalyst is used as the catalyst.

24. A process for the manufacture of a packing material for reversed phase liquid chromatography, comprising particles having a silicone polymer film coated on substantially the entire surface thereof, said process comprising the steps of:

(a) bringing a cyclic silicone compound having the general formula (VI):

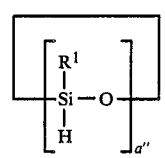

(VI)

wherein $R^1$ represents a lower alkyl or aryl group, and a″ is an integer of 3 to 100, into contact with particles, whereby the silicone compound is polymerized on substantially the entire surface of the particles, and (b) carrying out an addition reaction of a vinyl compound having the general formula (III):

$R^8—CH=CH—R^9$     (III)

wherein $R^8$ represents hydrogen or alkyl group having 1 to 20 carbon atoms and $R^9$ represents hydrogen; both of $R^8$ and $R^9$ represent alkyl group having 1 to 20 carbon atoms; or $R^8$ represents phenyl group substituted with alkyl group having 1 to 20 carbon atoms and $R^9$ represents hydrogen; to unreacted Si—H groups, thereby producing the particles having the silicone polymer film coated on substantially the entire surface thereof, said silicone polymer having the general formula (IV):

$$[R^1SiO_{3/2})_{x'}(R^1HSiO)_{y'}(R^1R^7SiO)_z]_u \quad (IV)$$

wherein $R^1$ has the meaning as given above, $R^7$ represents a residue of the addition reaction of the vinyl compound of the general formula (III), u is an integer for making a molecular weight of the polymer more than 150,000, and $x'$, $y'$ and z have the following relationships:

$x'+y'+z=1$, $0<x'\leq 0.5$ $0<y'\leq 0.4$, and $0.5\leq z<1.0$.

25. A process according to claim 24 wherein the silicone compound having the general formula (VI) is brought into contact with particles selected from a group consisting of silica gel, alumina, glass bead and zeolite.

26. A process according to claim 25, wherein the silica gel having a particle size of 3–500 um and pores of 50–500 Å is used.

27. A process according to claim 24, wherein, in step (a), a silicone compound having the general formula (VI) in a vapor phase is brought into contact with the particles.

28. A method for making a reversed phase liquid chromatigraphic separation of components contained in a liquid sample which comprises contacting the liquid sample with a chromatographic column containing a packing material comprising particles having a silicone polymer film coated on substantially the entire surface thereof, said packing material being produced by a process comprising the steps of:
(a) bringing a cyclic silicone compound having the general formula (VI);

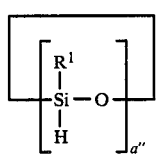
(VI)

wherein $R^1$ represents a lower alkyl or aryl group, and a" is an integer of 3 to 100, into contact with particles, whereby the silicone compound is polymerized on substantially the entire surface of the particles, and
(b) crosslinked unreacted Si—H groups in the presence of a catalyst, thereby producing the particles having the silicone polymer film coated on substantially the entire surface thereof, said silicone polymer having the general formula (II):

$$[(R^1SiO_{(3/2)})_x(R^1HSiO)_y]_t \quad (II)$$

wherein $R^1$ has the meaning as given above, t is an integer for making a molecular weight of the polymer more than 150,000, and x and y have the following relationships:

$x+y=1$, and $0.6\leq x<1$.

29. A method for making a reversed phase liquid chromatographic separation of components contained in a liquid sample which comprises contacting the liquid sample with a chromatographic column containing a packing material comprising particles having a silicone polymer film coated substantially the entire surface thereof, said process comprising the steps of:
(a) bringing a cyclic silicone compound having the general formula (VI):

(VI)

wherein $R^1$ represents a lower alkyl or aryl group, and a" is an integer of 3 to 100, into contact with particles, whereby the silicone compound is polymerized on substantially the entire surface of the particles, and
(b) carrying out an addition reaction of a vinyl compound having the general formula (III):

$$R^8-CH=CH-R^9 \quad (III)$$

wherein $R^8$ represents hydrogen or alkyl group having 1 to 20 carbon atoms and $R^9$ represents hydrogen, both of $R^8$ and $R^9$ represents alkyl group having 1 to 20 carbon atoms, or $R^8$ represents phenyl group substituted with alkyl group having 1 to 20 carbon atoms and $R^9$ represents hydrogen; to unreacted Si—H groups, thereby producing the particles having the silicone polymer film coated on substantially the entire surface thereof, said silicone polymer having the general formula (IV):

$$[(R^1SiO_{(3/2)})_{x'}(R^1HSiO)_{y'}(R^1R^7SiO)_z]_u \quad (IV)$$

wherein $R^1$ has the meaning as given above, $R^7$ represents a residue of the addition reaction of the vinyl compound of the general formula (III), u is an integer for making a molecular weight of the polymer more than 150,000, and $x'$, $y'$ and z have the following relationships:

$x'+y'+z=1$, $0<x'\leq 0.5$ $0<y'\leq 0.4$, and $0.5\leq z<1.0$.

* * * * *

UNITED STATES PATENT AND TRADEMARK OFFICE
CERTIFICATE OF CORRECTION

PATENT NO. : 4,743,377
DATED : May 10, 1988
INVENTOR(S) : Ohtsu et al.

It is certified that error appears in the above-identified patent and that said Letters Patent is hereby corrected as shown below:

| | |
|---|---|
| Title Page, under "U.S. Patent Documents", lines 2, 3, 4, 5, 6, 7, 8, 9, 10 and 13 | Add --et al.-- after each name |
| Col. 2, line 62 | Insert --wherein-- before "$R^1$" |
| Col. 2, line 62 | Delete "$R_4$" and substitute --$R^4$-- |
| Col. 3, line 7 | Insert --BRIEF-- before "EXPLANATION" |
| Col. 4, line 47 | Delete "Rhu 1" and substitute --$R^1$-- |
| Col. 14, line 43 | Delete "a" and substitute --an-- |
| Col. 23, line 39 | Delete "an" and substitute --and-- |
| Col. 30, line 60 | Correct spelling of --independently-- |
| Col. 33, line 4 | Insert --(-- before "R" in first instance and insert --)-- after "3/2" |

Signed and Sealed this

Seventh Day of February, 1989

*Attest:*

DONALD J. QUIGG

*Attesting Officer*      *Commissioner of Patents and Trademarks*